C. BERGSVIK.
SPECTACLES.
APPLICATION FILED MAR. 24, 1919.
1,309,793.
Patented July 15, 1919.
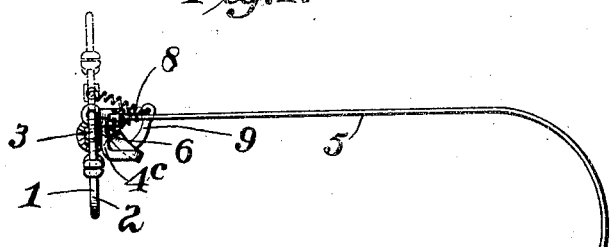
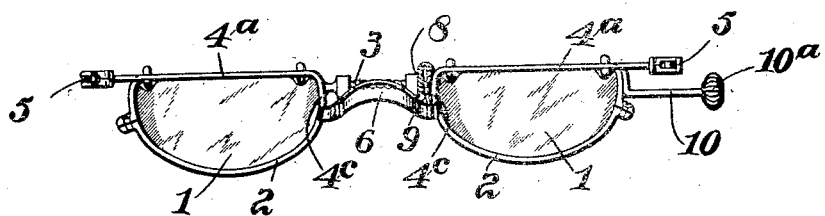
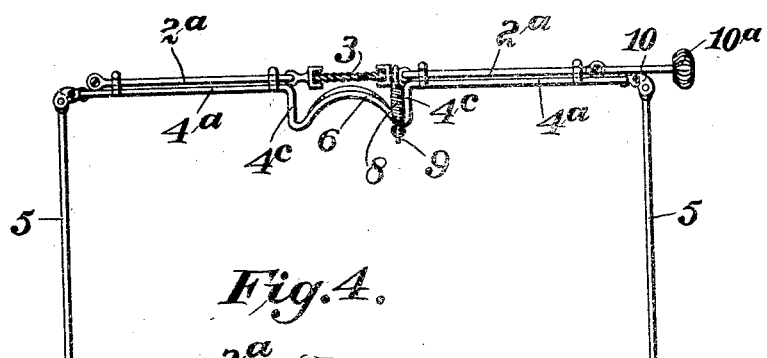
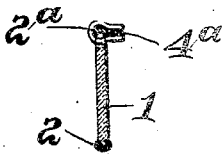
Inventor:
Chris Bergsvik,
by Spear Middleton Donaldson & Spear
Atty's.

UNITED STATES PATENT OFFICE.

CHRIS BERGSVIK, OF YANKTON, SOUTH DAKOTA.

SPECTACLES.

1,309,793.  Specification of Letters Patent.  Patented July 15, 1919.

Application filed March 24, 1919. Serial No. 284,736.

*To all whom it may concern:*

Be it known that I, CHRIS BERGSVIK, a citizen of the United States, residing at Yankton, South Dakota, have invented certain new and useful Improvements in Spectacles, of which the following is a specification.

My present invention relates to improvements in spectacles of the type embodying a pair of lenses which are pivotally connected with the spectacle frame and capable of being turned up out of the line of vision when not required.

The invention relates particularly to spectacles designed for persons requiring lenses for reading only or close work and aims to provide a simple, economical and durable construction in which the lenses, when turned down will be in proper position and when turned up out of the way will not be elevated to such a degree as to be unsightly. The invention further aims to provide a construction in which the number of frame parts observable will be reduced to a minimum.

With these and other objects in view the invention includes the novel features of construction and arrangement and combination of parts hereinafter described and particularly defined by the appended claims, an embodiment of my invention being illustrated in the accompanying drawing, in which, Figure 1 is a side elevation of a pair of spectacles embodying my invention.

Fig. 2 is a view looking toward the left (Fig. 1).

Fig. 3 is a plan view, and,

Fig. 4 a vertical section through the left hand lens.

Referring by reference characters to this drawing the numerals 1, 1, designate the lenses which are made in the shape of half lenses with substantially straight upper edges and are provided with encircling frames 2 which are connected rigidly together by a bridge piece 3.

A supplemental or carrying frame is provided which has portions $4^a$ which are substantially straight and have their outer ends connected by the usual hinges at the temples 5. The inner or adjacent ends of the portions $4^a$ are curved or offset as indicated at $4^c$ and are connected to or carry the nose piece 6.

It will be understood that the parts $4^a$, $4^c$ and 6 may be made in one integral piece, suitably shaped, or of a plurality of pieces suitably connected, as desired.

The lens frames are pivotally connected at their upper parts to the bars or members $4^a$ and in order to hold the upper frame bars of the lenses in substantial alinement with the bars or portions $4^a$ so as to give the appearance of a single bar both to the wearer and the observers, I connect each straight frame portion $4^a$ at each end to the corresponding portion of the lens frame by a hinge connection. This hinge connection I prefer to make in the form of an eye secured to one of the parts, for example $4^a$, and encircling the other part, to wit, the straight upper portion $2^a$ of the lens frame. The lenses are notched at each end to make space for these eyes.

To hold the lenses in either a depressed or lowered position for close work, as shown in full lines in Fig. 1, or in an elevated position as shown in dotted lines, I provide a spring 8 which may be in the form of a tension spring having one end connected to the eye-glass frame, as for example, at one end of the bridge piece 3 and having the other end secured to a projection 9 carried by the nose piece, the spring being so arranged as to hold the eye-glass frame at the limit of its movement in either direction. Movement in either direction is limited by the eye-glass frame contacting with the hinge members on the carrying frame.

For convenience in turning or manipulating the lenses I provide a rod extension 10 at one end connected with the lens frame and having a knurled knob $10^a$.

Having thus described my invention, what I claim is:

1. In combination, a primary or carrying frame having a nose piece and temples and having substantially straight intermediate portions, and a secondary frame comprising half lens carrying members having substantially straight sides and eyes secured to the straight portions of one of said frames near each end thereof and engaging corresponding portions of the other frame.

2. In combination, a primary frame having a nose piece and temples and having straight intermediate portions, a secondary frame comprising half lens carrying members having straight portions and a connecting bridge, eyes forming hinge means connecting said straight portions of one frame with those of the other, a projection on the nose piece, and a spring connecting said projection with said bridge.

In testimony whereof, I affix my signature.

CHRIS BERGSVIK.